UNITED STATES PATENT OFFICE.

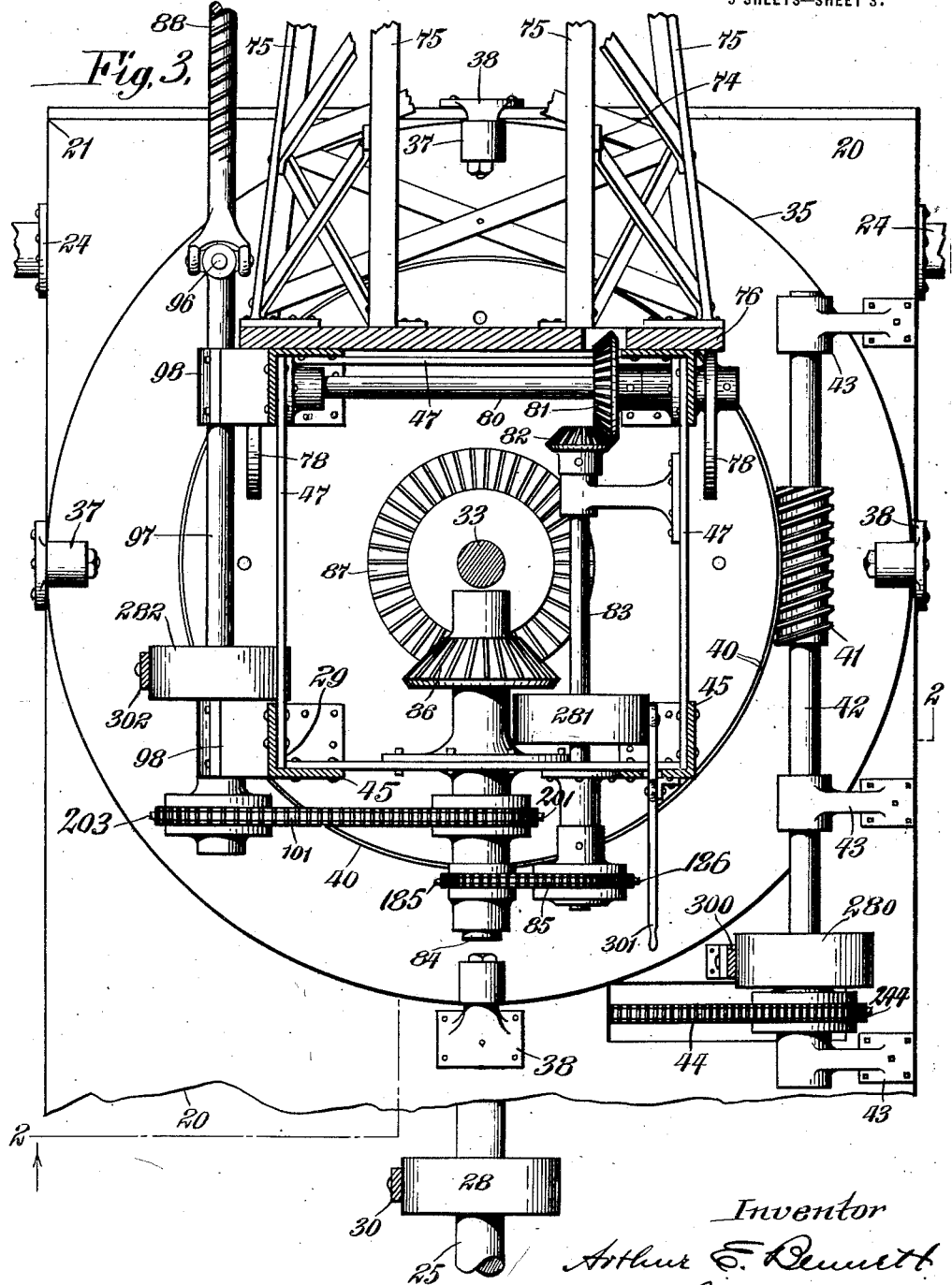

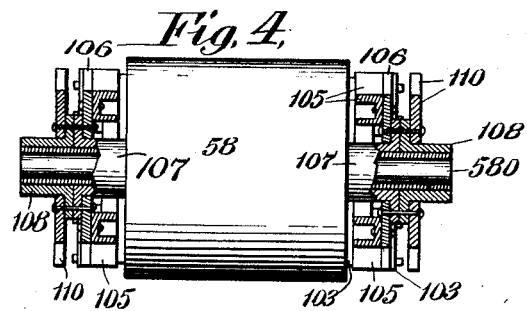
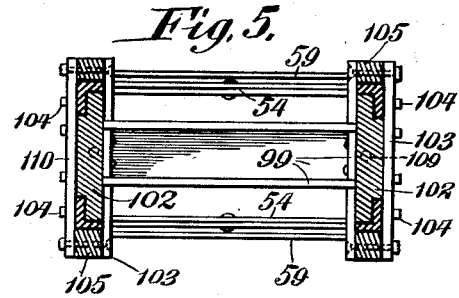
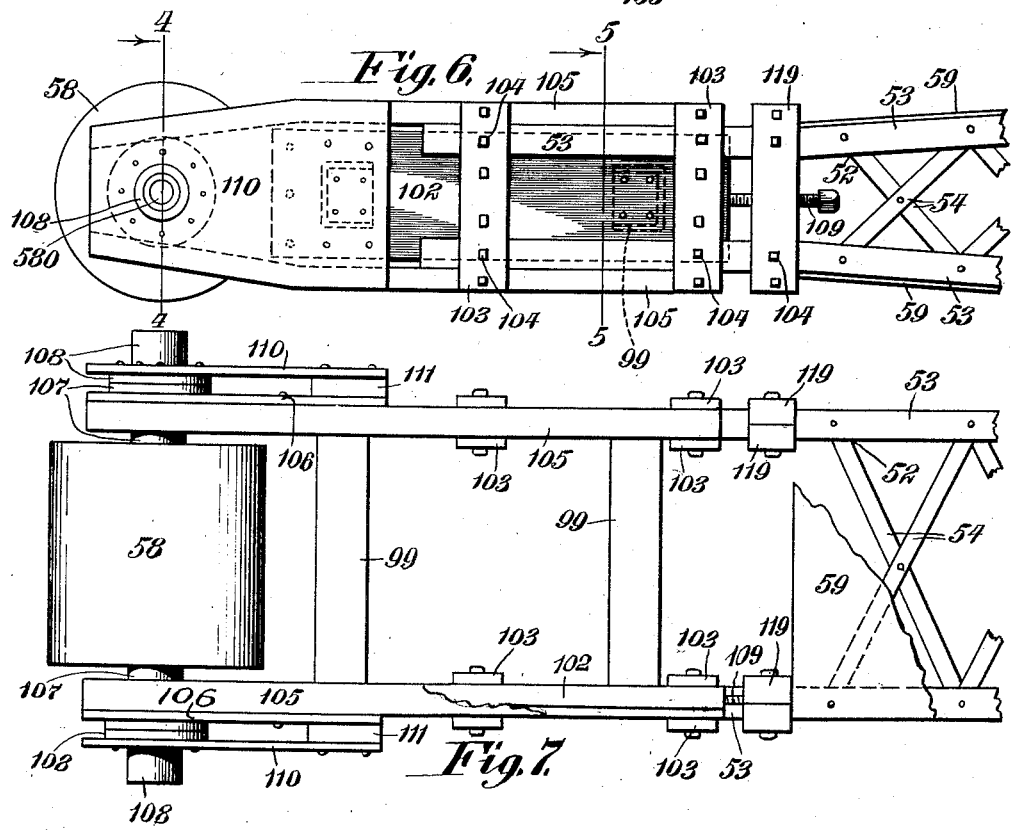
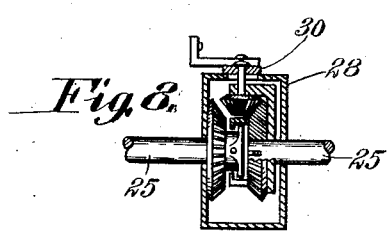

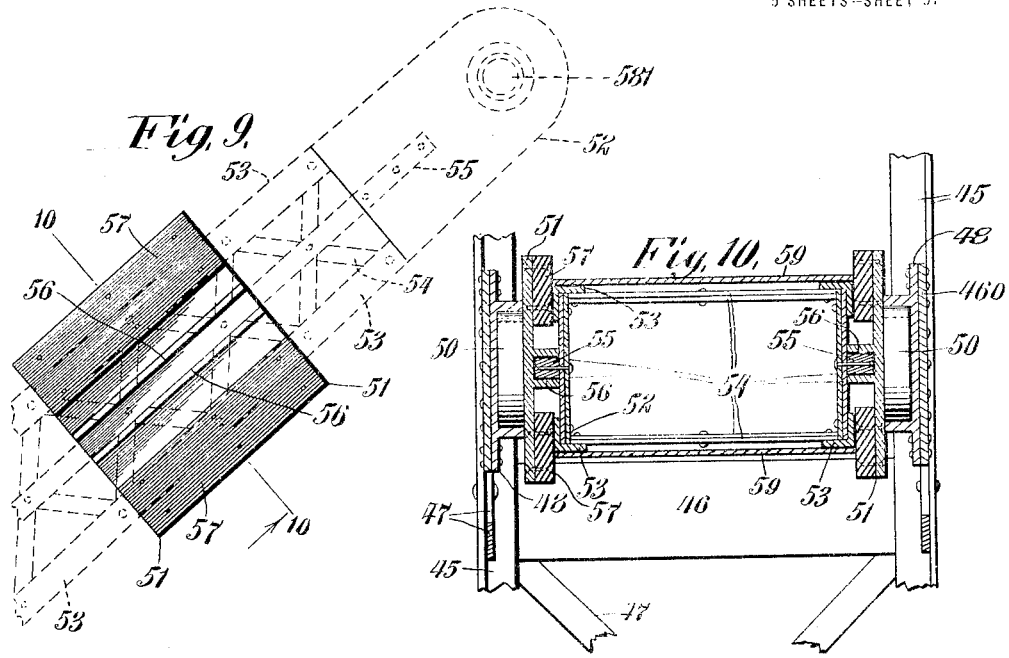

ARTHUR E. BENNETT, OF BUFFALO, NEW YORK, ASSIGNOR OF ONE-HALF TO HARRY B. STALEY, OF BUFFALO, NEW YORK.

CONVEYING APPARATUS.

1,382,266.  Specification of Letters Patent.  Patented June 21, 1921.

Application filed August 13, 1919. Serial No. 317,104.

*To all whom it may concern:*

Be it known that I, ARTHUR E. BENNETT, a citizen of the United States, residing in Buffalo, in the county of Erie and State of New York, have invented new and useful Improvements in Conveying Apparatus, of which the following is a specification.

This invention relates to an apparatus for conveying and lifting material and discharging the same into a storage receiver or hopper from which latter the same may be disposed of in any desired manner. The apparatus is more particularly designed for scooping up sand, gravel, etc., from a pile on the ground, and dropping the same into an elevated hopper from which the material may be fed in such measured amount as may be from time to time required.

The object of the invention is to produce a conveying apparatus which may be variously shifted within a wide latitude of movement without necessitating movement of the storage hopper into which it discharges. A further object of the invention is to provide for such a controlled movement of the feeding end of the conveying apparatus as to permit of moving the same in an adjustable and substantially horizontal plane so as to compensate for the varying surface of the ground from which the material is being scooped.

A further object of the invention is to provide, in a strong but inexpensive manner, for adjustment of the belt of chain pulleys so as to take up the slack. A still further object of the invention is to provide for a reliable and powerful means of transmitting power to the conveying mechanism, irrespective of the relative positions of the different parts which make up the same. Further objects and advantages will be more clearly disclosed in the subsequent detailed description and appended claims.

Figure 1:
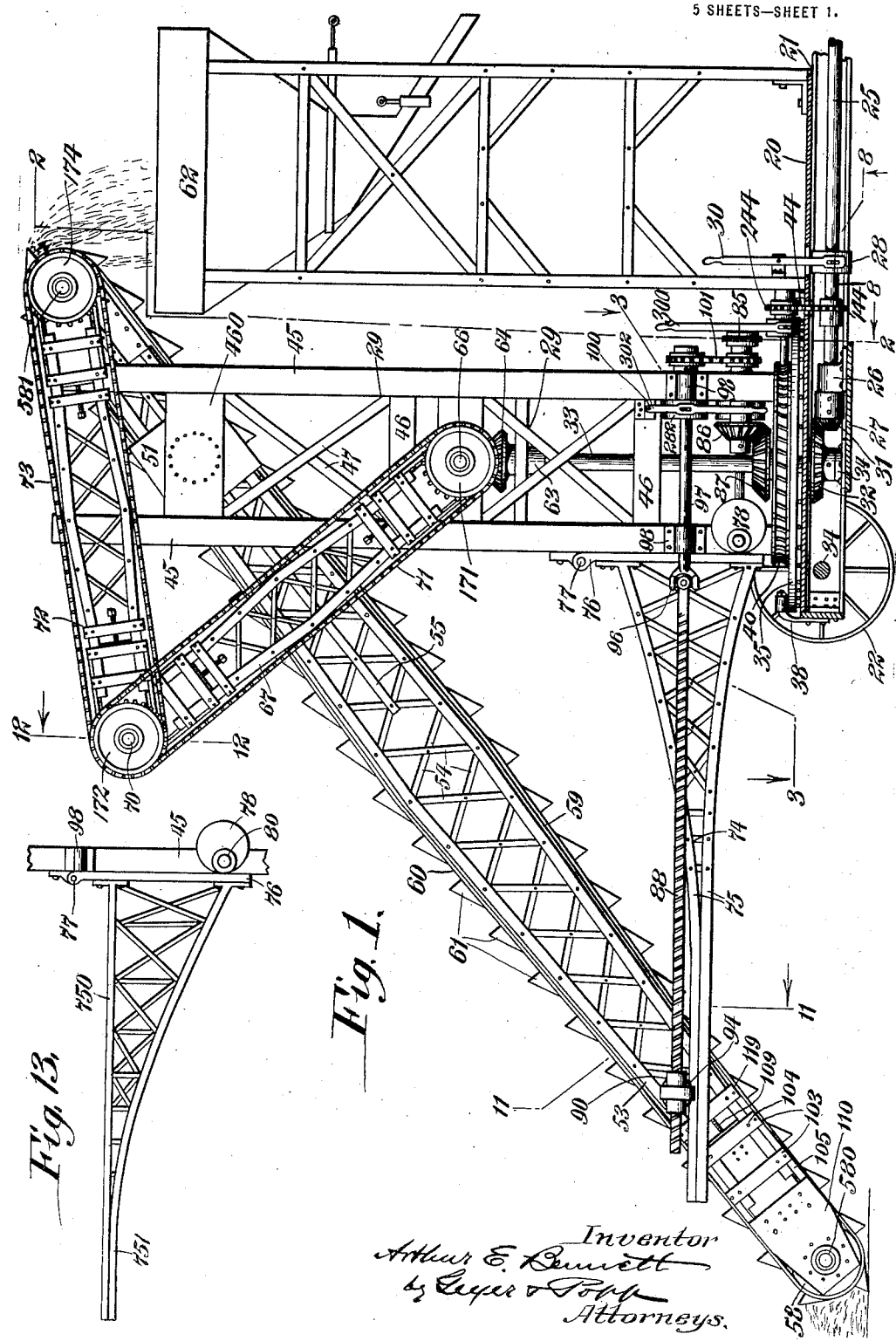
Figure 2:
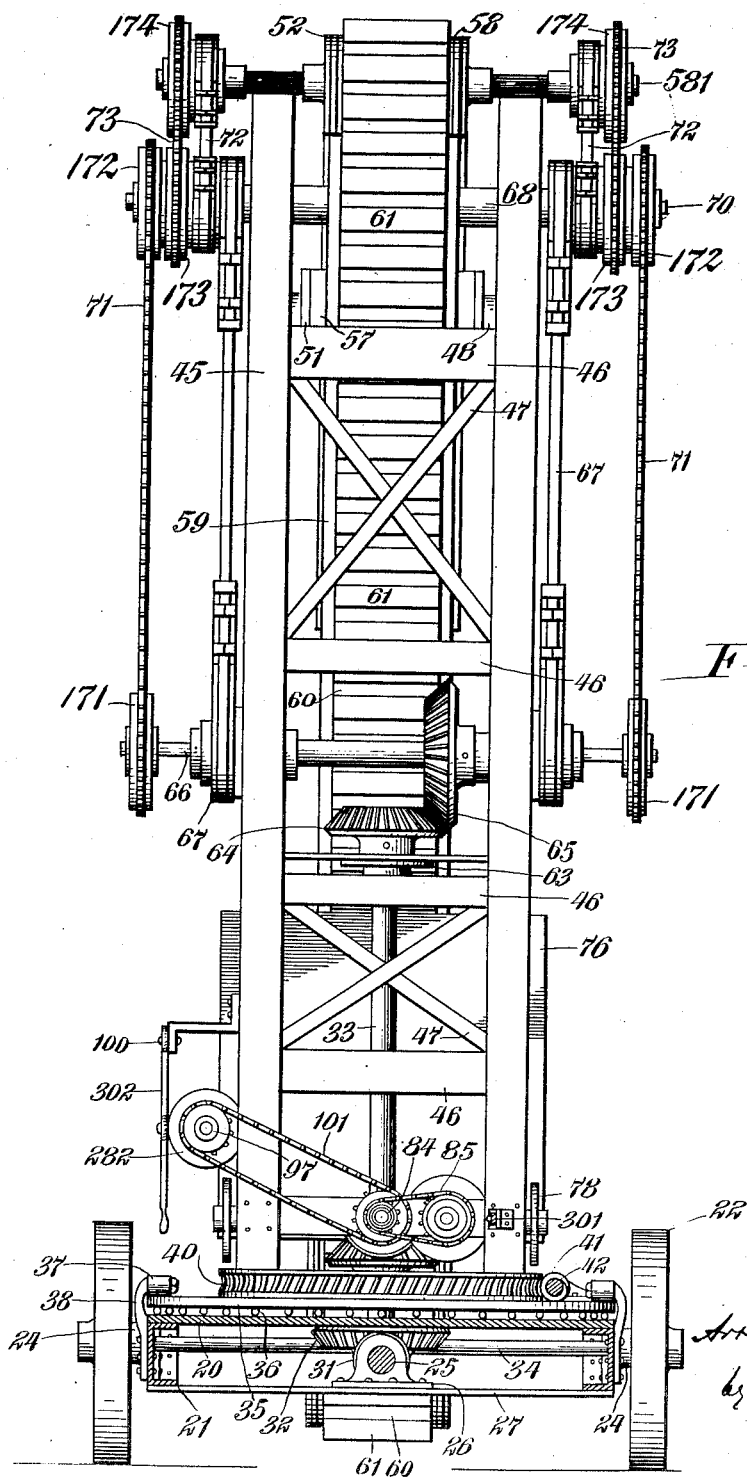

In the accompanying drawings: Figure 1 is a side elevation of the conveying apparatus showing the same as typically mounted on a movable platform or carriage only the one end of which is shown. Fig. 2 is a vertical transverse section thereof, taken on line 2—2, Fig. 1. Fig. 3 is an enlarged horizontal section taken on line 3—3, Fig. 1. Figs. 4 and 5 are enlarged and substantially vertical sections through the outer or receiving end of the conveyer or frame taken on the correspondingly numbered lines in Fig. 6. Fig. 6 is an enlarged and fragmentary side elevation of the conveyer frame. Fig. 7 is a fragmentary top plan thereof. Fig. 8 is a longitudinal sectional detail, on an enlarged scale, through one of the reverse gears and taken on line 8—8, Fig. 1. Fig. 9 is an enlarged side elevation of one of the pivotal guide blocks associated with the conveyer frame. Fig. 10 is a fragmentary enlarged and substantially vertical section through the conveyer frame at its junction with the main vertical standard taken on line 10—10, Fig. 9. Fig. 11 is an enlarged and substantially vertical section through the conveyer frame taken on line 11—11 Fig. 1. Fig. 12 is an enlarged vertical section taken on line 12—12, Fig. 1. Fig. 13 is a fragmentary side elevation showing a modified form of supporting beam.

Similar characters of reference refer to like parts throughout the several views.

This improved conveying apparatus may be mounted in any desirable way, but it is preferred that the same be rendered portable, as for instance by mounting the same upon the bed plate 20 of a movable platform, carriage or wagon 21 which is provided with suitable wheels 22 and axle 34 which latter is suitably journaled in companion bearing collars 24 secured to the sides of the movable platform. Arranged longitudinally and centrally of said movable platform and below the bed plate 20 is a propeller shaft 25 which is suitably connected to a gas engine or other source of power (not shown) at its rear end and is suitably journaled in a bearing 26 at its forward end, said bearing being secured to a transversely arranged tie plate 27 which is secured to the bottom of the movable platform. It is preferable to control the propeller shaft by means of a reverse gear or clutch 28 and for this reason the propeller shaft 25 is preferably made up of two sections the abutting ends of which are journaled in said reverse gear 28. Any suitable reverse gear or one way clutch may be employed, a formal reverse gear being shown in Fig. 8 in neutral position. This formal reverse gear comprises a large forward bevel gear which is provided with a rearwardly extending hub, which latter is keyed to the forward driving end of the shaft 25 and is also provided with a pair of short, laterally extending studs or arms. Splined on the rear or driven end of the shaft 25 is a similar large bevel gear which carries on its forward face, a pair of longitudinally disposed posts or arms whose extreme forward ends are turned inwardly to form a pair of inwardly and laterally extending engaging fingers. Rearwardly of this rear bevel gear, is slidably mounted on the rear shaft 25 a slip collar whose upper end carries a flange in which a small bevel pinion is journaled on the stub shaft whose axis is radial with respect to the shaft 25. This small bevel pinion is constantly in mesh with the rear large bevel wheel. The whole reversing gear mechanism is preferably arranged within a dust proof casing 28 which does not however mechanically enter into the operation of the clutch. In operating the clutch, we will assume that the lower end of the operating clutch lever 30 is moved forwardly, that is to the left, as shown in Fig. 8. This will cause the rear large bevel gear and the bevel pinion on its slip collar to be bodily moved forward by reason of the fact that said operating lever 30 is pivoted to said slip collar. This action brings the bevel pinion into mesh with the front large bevel gear. Inasmuch as the slip collar is prevented at all times from rotating by reason of its connection with the operating lever 30, it follows that the flow of power will travel from the front driving shaft 25 through the front large bevel gear which is pinned to it, thence, through the small bevel pinion which is now rotating about a stationary axis, and thence to the rear large bevel gear which is splined to the rear driven shaft. The latter is, of course, now rotating in a direction opposite to that of the front driving shaft.

If, now, however, the lower end of the operating lever 30 be moved rearwardly, the bevel pinion will be moved out of mesh with the front large bevel gear and all flow of power will thereupon cease. A further movement of said lever 30 in the same direction, will cause the inwardly and laterally extending fingers of the rear large bevel gear to intermesh or bear circumferentially against the outwardly and laterally extending studs of the front large bevel gear. This will lock the front and rear shafts 25 together so that the same will rotate in unison in the same direction. When the operating handle 30 of the clutch is moved in the one direction, the forward part of the propeller shaft will be caused to rotate in the one direction, while if the operating handle be moved in the other direction past its neutral position, said forward end of the propeller shaft will be caused to rotate in the opposite direction.

On the forward end of the forward section of the propeller shaft is arranged a driving bevel pinion 31. This bevel pinion meshes with a bevel gear 32 which is mounted on the lower end of a vertical turret shaft 33, said shaft being suitably journaled in a vertical bearing block 34 which is secured to the transverse tie plate 27 of the movable platform. Arranged horizontally above the top surface of the bed plate 20 is a circular turret plate 35 arranged to rotate on a vertical axis which is concentric with the vertical turret shaft 33 aforesaid. The turret plate is preferably supported by anti-friction rollers or balls 36 so as to be able to rotate freely, and it is also preferable to prevent said turret plate from cocking up on one side by providing a number of anti-friction rolls 37, which bear against the upper peripheral edge of the turret plate and are journaled on brackets 38 secured to the movable platform 20. Concentrically secured to the upper face of the turret plate 35 is a comparatively large worm wheel 40 provided with a screw thread which meshes with a worm gear 41. This worm gear is secured to a shaft 42 which is journaled in bearing brackets 43, the movement of the shaft in one direction or the other, being regulated by means of a reverse gear 280 and operating handle 300. The power for said shaft 42 is derived from the main propeller shaft 25 by means of a link chain belt 44 whose turns engage with suitable sprocket wheels 144, 244 mounted on the two shafts in question.

On the upper surface of the turret plate 35 is arranged a rotatable tower or turret standard 29 which turns with said turret plate 35. Preferably said standard is constructed of four upright angle irons 45 which are secured to said turret plate 35 and are suitably braced and tied together by means of horizontal tie plates 46 and diagonal truss bars 47. To the longitudinal tie plates 460 on the upper part of the standard, as best seen in Fig. 10, are secured bearing blocks 48 which are transversely in line and are arranged to receive journals 50 of pivotal-slide blocks 51. These pivotal-slide blocks are thereby free to rotate on a transverse axis relatively to the turret standard in which they are journaled. Arranged between said slide blocks is a conveyer frame 52 comprising four angle iron corner bars 53 which are suitably tied together by means of the truss bars 54. Secured longitudinally to said truss bars on each side of the conveyer frame 52 are guide bars 55 which are arranged to be received within companion guide grooves 56 on the inner faces of the pivotal-slide blocks 51. Each of said blocks is also provided with a pair of wide limiting faces 57 which bear against opposite vertical sides of the angle iron corner bars 53 of the conveyer frame and thereby centralize said conveyer frame in the turret standard. Thus said conveyer frame is free to swing in a vertical plane within said turret standard and also is free to slide back and forth therein.

Rotatably mounted on the transverse shafts 580 and 581 and journaled horizontally at opposite ends of said conveyer frame 52 are belt pulleys or wheels 58. Passing with its opposite turns around said belt pulleys is a conveyer or transporting belt 60 which is preferably supplied with a plurality of scoops or buckets 61, which, on the upper stretch of the conveyer belt, preferably open upwardly or rearwardly. By rotating the belt pulleys 58 in a clockwise direction when viewed from the left side the buckets 61 are adapted to "eat into" a pile of material such as sand or gravel which has been deposited on the ground near the lower end of the conveyer frame. Said buckets carry the material upwardly and rearwardly and then discharge the same into a suitable hopper 62 which is secured to the movable platform 21 and is located adjacent to the upper turn of the conveyer belt. The material may of course be deposited directly onto the upper stretch of the conveyer belt while the same is in motion. Preferably the upper and lower stretches of the conveyer belt 60 are held from abrasion against the diagonal brace bars or other irregular parts of the conveyer frame 52 by providing the upper and lower faces of said conveyer frame with rubbing plates 59 which extend the full width of said conveyer frame and are secured to the angle iron frame bars 53 and provide a flat smooth surface for the belt to ride upon.

Power is transmitted to the conveyer irrespective of the position of the conveyer frame and it is accomplished as follows: The upper end of the vertical turret shaft 33 is suitably journaled in a bearing 63 on the turret standard and is provided on its extreme upper end with a driving bevel gear 64 which meshes with a driven bevel gear 65 secured to a transversely arranged lower horizontal shaft 66 suitably journaled in the turret standard. Pivotally mounted on each side of said turret standard and concentrically with said shaft 66 but independently thereof, are two primary link frames 67 which extend upwardly and forwardly and are both secured at their outer ends to a common sleeve 68. Rotatably arranged within this sleeve, as shown in Fig. 12, is an upper transverse shaft 70 which is suitably driven from the lower transverse shaft 66 by means preferably of two chain belts 71 which pass around suitable sprocket wheels 171, 172 secured to these shafts respectively. The lengths of the primary link frames 67 may be altered so as to compensate for the stretch of the belt chains in a manner to be subsequently described. Pivotally mounted on the sleeve 68 are two secondary link frames 72 which extend rearwardly and are pivotally connected with the upper rear end of the conveyer frame, coaxially with the shaft 581 of the upper belt pulley 58. Said upper belt pulley shaft 581 is driven from the upper transverse shaft 70 by means of belt chains 73 which engage suitable sprocket wheels 173, 174 mounted on these shafts respectively, and compensation for excessive slack in these belt chains is provided for by altering the length of the secondary link frames just as in the case of the primary link frames.

The lower end of the conveyer frame is supported and guided by a substantially horizontal supporting beam 74 which is made up preferably of four channel irons 75 bracketed together and stiffened as shown in Figs. 1 and 11. Preferably the channel irons meet each other at their outer ends and run parallel to each other for a considerable distance rearwardly and then diverge at their rear ends the upper irons curving upwardly and the lower irons downwardly so as to obtain the necessary cantaliver-truss strength. If desired however the upper channel irons may be straight for their entire length with only the lower angle irons curving downwardly at their rear ends as shown at 750, 751, in Fig. 13. In either case however the rear end of the supporting beam is secured to a transversely disposed hinge plate 76 which is hinged or pivotally connected with the turret standard 29 by the horizontal pivot pin 77. This hinge plate 76 is adjustably movable so as to raise or lower the supporting beam and thereby the forward end of the conveyer frame, and this is accomplished by providing two eccentrics or cams 78, both of which are secured to a horizontal transverse shaft 80 which is suitably journaled in the turret standard. The eccentric shaft 80 carries a bevel gear 81 which meshes with a driving bevel pinion 82 that is in turn secured to a horizontal longitudinal driving shaft 83. The rotation of this shaft 83 is controlled by a reverse gear 281 and a control handle 301 and the power is derived from a longitudinal jack shaft 84 by means of a chain belt 85 passing around sprocket wheels 185, 186 on these shafts. Said jack shaft 84 is suitably journaled on the turret standard 29 and carries a driven bevel gear 86 at its forward end which meshes with a driving bevel gear 87 secured to the vertical turret shaft 33. Thus by the movement of operating handle 301, the pair of eccentrics 78 may be partially rotated in one direction or the other and the supporting beam 74 thereby raised or lowered any desired amount.

The position of the lower or forward end of the conveyer frame relative to the supporting beam 74, is controlled by means of a screw 88 which is longitudinally disposed on one side of the machine and is provided with a screw thread which engages with an internally threaded sleeve 90, as best seen in Figs. 1 and 11. Said sleeve 90 is secured to a transverse supporting shaft 91 which is journaled in bearings 92 secured to the lower side of the forward end of the conveyer frame 52. Journaled on said supporting shaft 91 are two anti-friction rollers 93 which bear against the upper faces of the upper channel irons 75 of the supporting beam 74, so as to allow the conveyer frame 52 to be freely moved forwardly or backwardly upon said supporting beam. The conveyer frame is preferably restrained against undue lateral movement by means of outer guide collars 94 secured to the supporting shaft 91 and arranged to bear against the outer faces of the supporting beam 74 and is also preferably restrained by guiding lugs 95 extending downwardly from the supporting shaft bearings 92 and arranged to engage with the inner faces of said supporting beam 74. This construction permits of the automatic raising of the outer end of the conveyer frame should one of the buckets of the conveyer belt strike a boulder or other obstacle on the ground.

The rear end of the screw 88 is connected by means of a knuckle or universal joint 96 to a horizontal longitudinal shaft 97 which is suitably journaled in bearings 98 secured to the turret tower. The rotation of said shaft 97 in one direction or the other is governed by means of a reverse gear 282 and a control handle 302 slidably connected therewith and suitably pivoted at 100 to the turret standard. The shaft 97 derives its power from the longitudinal jack shaft 84 aforementioned by means of a belt chain 101 passing around suitable sprockets 201, 203 mounted on these shafts, respectively.

The forward or lower end of the conveyer frame is specially constructed to permit of adjustment of the lower belt pulley 58 and to stand the heavy strains to which this part of the apparatus is subjected, as best shown in Figs. 4–7. On each side of the conveyer frame 52, between each upper angle iron frame bar 53 and the corresponding lower bar is slidably arranged an adjustable slip or sliding plate 102. Against the outer and inner faces of each slip plate are secured substantially vertical locking or guide bars 103, which bear against opposite sides of the angle-iron frame bars 53 and are adapted to be coupled or locked thereto by means of set screws 104 which engage with suitable female screw threads in said locking bars and bear with their inner ends against the said frame bars 53. Arranged against the outer faces of said frame bars 53 and adapted to slide back and forth thereon are longitudinal stiffening bars 105 whose inner ends are arranged between the adjacent ends of each pair of companion locking bars 103 and whose outer ends are preferably bent in toward each other. Secured to the outer lateral faces of both stiffening bars 105 and the outer end of the slip plate 102 are bracing plates 106, preferably tapered outwardly at their outer ends. Secured to the outer faces of both bracing plates 106 are inner belt pulley bearings 107 in which is journaled the rotatable shaft 580 of the lower belt pulley 58. Against the outer faces of the flanges of said inner bearings 107 are concentrically secured the flanges of outer bearings 108, which also receive the shaft 580 of the lower belt pulley 58. Thereby is provided a strong pivotal support for said shaft having a low unit bearing pressure and largely free from dust by reason of the fact that the outer ends of the two bearings are a considerable distance away from the edge of the conveyer belt 60 which passes around the belt pulley 58. Any material which drops from the belt, does not, thereby, come in contact with the shaft 580 which carries said front belt pulley 58, this being particularly important in the case of the inner bearings 107 which extend a considerable distance inwardly of the bracing plates 106. For the purpose of bracing the outer bearings 108 and to relieve some of the heavy shock to which the lower end of the conveyer frame is subjected, outer brace plates 110 are provided which are secured to said outer bearings 108 at their forward parts and are secured at their rear ends through the medium of blocks 111, to the bracing plates 106. A durable and reliable construction is thereby secured. The means for adjustably moving the shaft of the lower belt pulley 58 is substantially the same at both ends of the primary and secondary link frames 67 and 72, respectively, except that no great strength is required in the latter case and therefore the brace plates 110 and outer bearings 108 are omitted. Arranged between and secured to the inner faces of the slip plates 102 are channel shaped distancing struts 99 which keep said plates properly spaced apart. Preferably a pair of stop cleats 119 is arranged on either side of each vertical pair of frame bars 53 and secured thereto and carries a threaded adjusting stop screw 109 which is adapted to bear against the inner end of its companion slip plate 102 and normally prevent the same from moving inwardly as would otherwise be likely to occur by reason of the tension of the conveyer belt. When the position of the slip plates is to be adjusted the set screws 104 are first loosened and then each stop screw 109 is properly rotated so as to move said slip plates outwardly sufficiently to take up the slack in the conveyer belt after which said set screws 104 are again tightened.

As the front or receiving end of the conveyer is moved horizontally over the surface of the ground or roadway from different parts of which the material is to be picked up and conveyed elsewhere, the primary and secondary links which are pivotally connected with each other and with the turret and conveyer frames fold and unfold relatively to each other and the belt transmitting mechanism having its wheels mounted concentrically with these pivotal connections permits of unlimited freedom of adjustment of the conveyer over the surface of the ground without disturbing the driving connection between the conveyer and the prime mover or between the latter and the means for turning the turret, and the various means for adjusting the conveyer.

On the whole the conveying apparatus is seen to be a great labor saver by reason of the ease and accuracy with which the lower end of the conveyer frame may be moved forwardly or backwardly in a substantially horizontal plane by the operation of but the one operating handle 302. Furthermore the plane of this movement may be adjusted so that the sand or other material which is being scooped up by the conveyer can be handled easily no matter what sort of a surface it is resting on, as for instance the surface of the road or the side of a hill or under other circumstances which would ordinarily necessitate the operation of a multiplicity of levers for shifting the conveyer frame. Furthermore, should the conveyer buckets strike a boulder or other large hard substance, then the outer end of the conveyer frame will lift up bodily and thereby avoid injuring the buckets or conveyer belt. Moreover, the conveyer belt rides on a smooth flat surface on the upper stretch thereof when carrying heavy loads and on its lower stretch when said belt is very taut. Furthermore the conveyer belt may be constantly receiving power from the propeller shaft 25 quite irrespective of what operating handles are being manipulated, inasmuch as the power transmission connected therewith operates in any and all of the adjustable positions of the different parts, and also operates while said positions are being adjusted. The whole conveying apparatus is low in manufacturing cost, it is not likely to get out of order and it is very flexible and responsive to the manipulation of the operator. On account of the ease and facility with which this conveyer can be operated it is possible to perform the work of conveying material from one place to another not only expeditiously but also more effectively and at much lower cost than is possible to do the same work by means of manual labor.

I claim as my invention:

1. A conveying apparatus comprising a standard, a substantially horizontal and rigid supporting beam connected to said standard, a conveyer frame pivotally and slidably mounted on said standard and supported at its lower end slidably upon said supporting beam, adjustable means connected to the lower end of said conveyer frame and to said standard for moving the conveyer frame outwardly or inwardly on said supporting beam, a conveyer mounted on said conveyer frame, and power transmission between said conveyer and said main frame operating independently of the relative position of the different parts which support said conveyer.

2. A conveying apparatus comprising a standard, a conveyer frame pivotally and slidably connected at its upper end with said standard, a conveyer mounted on said conveyer frame, a supporting beam horizontally pivoted to said standard and adjustable relatively thereto, link frames horizontally and pivotally connected together at their forward ends and pivotally connected at their rear ends respectively to the standard and to the conveyer frame, a power transmission mechanism passing from said standard to said conveyer through the link frames and having power transmission wheels whose axes are coincident with the pivotal points of connection of the members which support said mechanism, and a source of power connected to said transmission mechanism.

3. A conveying apparatus comprising a conveyer frame having frame bars, slip plates slidable longitudinally on said conveyer frame between said frame bars, a belt pulley pivotally connected with said slip plates, stiffening bars arranged outside of said frame bars and connected at their forward ends to said slip plates, transversely arranged pairs of locking bars secured to said slip plates and to said stiffening bars, and distancing struts arranged between said slip plates and secured thereto.

4. A conveying apparatus comprising a conveyer frame having frame bars, adjustable slip plates slidable longitudinally on said conveyer frame between said frame bars, a belt pulley pivotally connected with said slip plates, stiffening bars arranged outside of said frame bars and connected at their forward ends to said slip plates, transversely arranged pairs of locking bars secured to said slip plates and to said stiffening bars, distancing struts arranged between said slip plates and secured thereto, pairs of stop cleats secured to said frame bars, and stop adjusting screws arranged in said stop cleats and adapted to bear against the inner ends of said slip plates.

5. A conveying apparatus comprising a conveyer frame having frame bars, a slip plate slidable longitudinally between said frame bars, an inner belt pulley bearing secured to said slip plate, an outer belt pulley bearing secured to said inner bearing, a brace plate secured to said outer bearing and to said frame bars, a belt pulley journaled in both said inner bearing and said outer bearing, and a conveyer coöperating with said belt pulley.

6. A conveying apparatus comprising a standard, a rigid supporting beam connected therewith, a conveyer frame slidably and pivotally connected with said standard at its upper end and slidably resting on but not connected to said supporting beam at its lower end, a conveyer carried by said conveyer frame and means for driving said conveyer irrespective of the relative position of the conveyer frame with respect to the said standard.

7. A conveying apparatus comprising a standard, a substantially horizontal supporting beam hinged and adjustable thereto, a conveyer frame resting with its lower end on said supporting beam, an adjusting screw rotated from said standard and screw-connected to said conveyer frame so as to be capable of moving the same back and forth on said supporting beam, a conveyer mounted on said conveyer frame, and means for propelling said conveyer irrespective of the relative position of the conveyer frame to the frame.

ARTHUR E. BENNETT.